United States Patent [19]

Disanto et al.

[11] Patent Number: 5,223,823
[45] Date of Patent: Jun. 29, 1993

[54] ELECTROPHORETIC DISPLAY PANEL WITH PLURAL ELECTRICALLY INDEPENDENT ANODE ELEMENTS

[75] Inventors: Frank J. Disanto, North Hills; Denis A. Krusos, Lloyd Harbor, both of N.Y.

[73] Assignee: Copytele, Inc., Huntington Station, N.Y.

[21] Appl. No.: 950,966

[22] Filed: Sep. 23, 1992

Related U.S. Application Data

[63] Continuation of Ser. No. 667,630, Mar. 11, 1991, abandoned.

[51] Int. Cl.$^5$ .............................................. G09G 3/34
[52] U.S. Cl. ..................................... 340/787; 359/296
[58] Field of Search ............... 340/787; 313/505, 584; 359/290, 291, 292, 293, 294, 295, 296, 297, 241

[56] References Cited

U.S. PATENT DOCUMENTS

| | | | |
|---|---|---|---|
| 3,668,106 | 6/1972 | Ota | 359/296 |
| 4,062,009 | 12/1977 | Raverdy | 340/787 |
| 4,068,927 | 11/1978 | White | 359/296 X |
| 4,071,430 | 1/1978 | Liebert | 359/241 |
| 4,522,472 | 6/1985 | Liebert et al. | 359/296 |
| 4,648,956 | 3/1987 | Marshall et al. | 359/296 X |
| 4,680,103 | 7/1987 | Beilin Soloman, I et al. | 359/296 X |
| 4,742,345 | 5/1988 | DiSanto et al. | 340/783 X |
| 4,772,820 | 9/1988 | DiSanto et al. | 313/583 X |
| 5,041,824 | 8/1991 | DiSanto et al. | 340/787 |

Primary Examiner—Alvin E. Oberley
Assistant Examiner—Kara Farnandez
Attorney, Agent, or Firm—Arthur L. Plevy

[57] ABSTRACT

A triode-type electrophoretic display includes a fluid-tight envelope for containing an electrophoretic fluid with suspended pigment particles and has a glass viewing window upon which has been deposited a plurality of parallel cathode members. An electrically continuous grid member with a plurality of pores therein is deposited upon a layer of insulation overlying the cathode members. The grid pores preferably extend through the grid and the insulation layer to allow the fluid to contact the cathode members. A glass backplate seals the rear of the envelope and serves as a substrate for a plurality of parallel anode members. The cathode and anode members form a matrix with a plurality of intersections and are selectively electrically chargeable to induce movement of the particles within the fluid to or away from the individual intersections, localized concentrations of particles at the intersections being visible through the viewing window. The electrical connections between the cathode members and their associated display driver circuits reside in the plane of the faceplate surface upon which they are affixed. Similarly, the connections between anode members and anode driver circuits reside in the plane of the backplate surface upon which they are affixed.

19 Claims, 3 Drawing Sheets

| | R1 | R2 | R3 | C1 | C2 | C3 | G |
|---|---|---|---|---|---|---|---|
| ERASE | 0 | 0 | 0 | $-V_1$ | $-V_1$ | $-V_1$ | $-V$ |
| HOLD | $+V_3$ | $+V_3$ | $+V_3$ | $+V_2$ | $+V_2$ | $+V_2$ | $-V$ |
| WRITE R1-C1 | 0 | $+V_3$ | $+V_3$ | $+V_1$ | $+V_2$ | $+V_2$ | $-V$ |
| HOLD | $+V_3$ | $+V_3$ | $+V_3$ | $+V_2$ | $+V_2$ | $+V_2$ | $-V$ |
| WRITE R2-C3 | $+V_3$ | 0 | $+V_3$ | $+V_2$ | $+V_2$ | $+V_1$ | $-V$ |
| HOLD | $+V_3$ | $+V_3$ | $+V_3$ | $+V_2$ | $+V_2$ | $+V_2$ | $-V$ |
| WRITE R3-C2 | $+V_3$ | $+V_3$ | 0 | $+V_2$ | $+V_1$ | $+V_2$ | $-V$ |

ELECTROPHORETIC DISPLAY PANEL WITH PLURAL ELECTRICALLY INDEPENDENT ANODE ELEMENTS

This is a continuation of application Ser. No. 07/667,630 filed Mar. 11, 1991, now abandoned.

FIELD OF THE INVENTION

The present invention relates to electrophoretic display panel apparatus and methods for fabricating same, and more particularly, to a triode-type electrophoretic display panel having an improved anode/grid configuration permitting more efficient electrical connection to display driver circuitry.

DESCRIPTION OF THE PRIOR ART

A variety of electrophoretic display panels are known. Of most direct pertinence to the present invention are those shown and described in U.S. Pat. No. 4,655,897 entitled "Electrophoretic Display Panels and Associated Methods", U.S. Pat. No. 4,742,345, entitled "Electrophoretic Display Panel Apparatus and Methods Therefor", and U.S. Pat. No. 4,772,820 entitled "Monolithic Flat Panel Display Apparatus". Each of the foregoing U.S. Patents is in the name of Frank J. DiSanto and Denis A. Krusos, the inventors herein, and each is assigned to the assignee herein, Copytele, Inc. The display panels shown in the foregoing patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized, it will cause a visually observable localized pigment particle migration. The localized pigment particle migration results either in a localized area of concentration or rarefaction of particles, depending upon the sign and direction of the electrostatic force and the charge on the pigment particles. The electrophoretic display apparatus taught in each of the foregoing U.S. Patents are triode type displays having a plurality of independent, parallel cathode conductor members deposited in the horizontal on one surface of a glass viewing screen. A layer of insulating photoresist material deposited over the cathode members and photoetched down to the cathode members to yield a plurality of insulator strips positioned at right angles to the cathode members, forms the substrate for a plurality of independent, parallel grid conductor members running in the vertical direction. A glass cap member forms a fluid-tight seal with the viewing window along the cap's peripheral edge for containing the fluid suspension and also acts as a substrate for the anode which is a conductor layer deposited on the interior flat surface of the cap. When the cap is in place, the anode surface is in spaced parallel relation to both the cathode members and the grid members. Given a specific particulate suspension, the sign of the electrostatic charge which will attract and repel the pigment particles will be known. The cathode member voltage and the grid member voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid members to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that when a given potential difference exists of a given polarity at a given intersection than a sufficient electrostatic field is present at the intersection to cause the writing of a visual bit of information on the display. In this manner, digitized data can be displayed on the electrophoretic display.

The electrophoretic displays described above utilize numerous electrically and physically independent cathode and grid members. For example, an $8\frac{1}{2}'' \times 11''$ display screen with a resolution of 200 lines per inch has 2,200 horizontal cathode row members and 1,700 vertical column grid members. In general, it is desirable to have the greatest number of horizontal and vertical members with the smallest possible width. This results in increased resolution and screen brightness, i.e., the more coordinates, the greater the resolution, the smaller the width of each element, the less the electrophoretic effect is obscured. Thus, the electrophoretic display raises a technical challenge that is common in the field of densely-packed miniaturized electrical devices, viz., while it is possible, using photoetching techniques and the like, to create extremely small circuit components, it is sometimes difficult to make the numerous electrical connections necessary to integrate the miniature components, in this case, the cathode and grid members and the display drivers, into a circuit. A variety of techniques to facilitate connection of miniature components have been developed. For example, U.S. Pat. No. 4,772,820 teaches an improved means for connecting numerous miniature cathode and grid members to display drivers. In accordance with that patent, the ends of the cathode and grid members resident upon the surface of the glass viewing screen of the display are metallized and grouped into a pattern which is adapted to electrically connect to mating output contacts of a driver circuit that is bonded to the screen at a predetermined aligned location. The bonding of the respective mating contacts is performed using wire bonding techniques which can be automated to yield quick and efficient connections. In yet a further aspect of the '820 patent the inputs to the driver circuit are also wire bonded to patterned input conductors provided on the surface of the screen thus yielding a substantially monolithic display screen having integral associated driver circuits.

Both U.S. Pat. Nos. 4,742,345 and 4,772,820 utilize a grid comprised of numerous electrically and physically independent vertically-oriented elements which supply the horizontal coordinate (abscissa) for each displayable location. The grid elements in the foregoing patents are spaced away from the cathode elements by a insulation layer. The connector ends and/or the electrical connections made to screen mounted driver circuits are, however, in the same plane as the cathode elements, i.e., deposited upon the surface of the viewing screen. Each grid element, therefore, must have a conductive path from the plane of the grid to the plane of the screen surface which is spaced therefrom by the insulation layer. Further, since both the grid connector/connections and the cathode connectors/connections are disposed on one surface, i.e., around the periphery the viewing area, this border area is congested.

It is there an object of the present invention to provide an electrophoretic display which eliminates a conductor pathway from the plane of the grid to that of the viewing screen, or, in other words, to provide vertical display conductors which may reside in the same plane as their connector ends/connections.

It is a further object to relieve the congestion of circuit components and conductor pathways around the periphery of the display area of an electrophoretic display screen.

It is yet another objective to provide a electrophoretic display which is easier and more economical to produce by simplifying the connection of the numerous vertical display elements to their respective driver circuits.

SUMMARY OF THE INVENTION

The problems and disadvantages associated with conventional electrophoretic displays are overcome by the present invention which includes a fluid-tight envelope having a portion thereof which is at least partially transparent for containing an electrophoretic fluid. The fluid has pigmented particles suspended therein. The envelope further contains a plurality of elongated substantially parallel horizontal conductor members disposed within a first plane, as well as, a plurality of elongated substantially parallel vertical conductor members electrically insulated from the horizontal members and disposed within a second plane. The first and second planes are substantially parallel and the horizontal members and vertical members form a matrix with a plurality of intersections when viewed along a line perpendicular to the first and second planes. A grid which is substantially electrically equipotential at all points thereof is interposed between and electrically insulated from the horizontal and vertical members. The grid has a plurality of pores therein capable of admitting the fluid. The horizontal and vertical members each are selectively electrically chargeable to induce movement of the particles within the fluid, the particles being at least partially visible through the transparent portion of the envelope.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
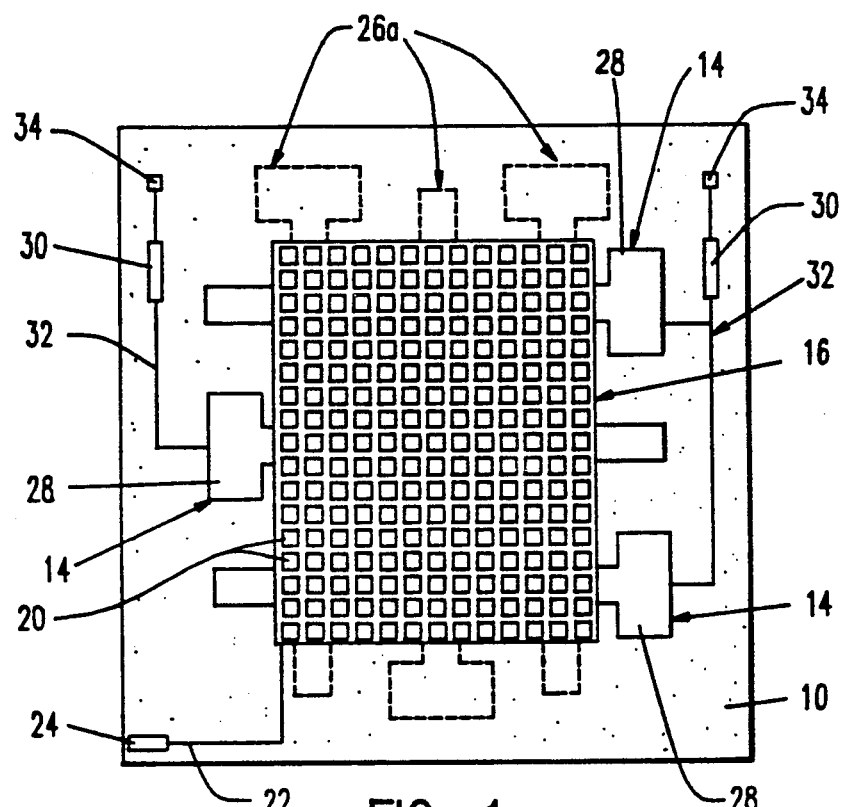
FIG. 1 is a diagrammatic plan view of the interior surface of a triode-type electrophoretic display panel faceplate, which, when assembled to constitute a fluid containing envelope, would be interior to the envelope, and which is in accordance with an exemplary embodiment of the present invention.
Figure 2:
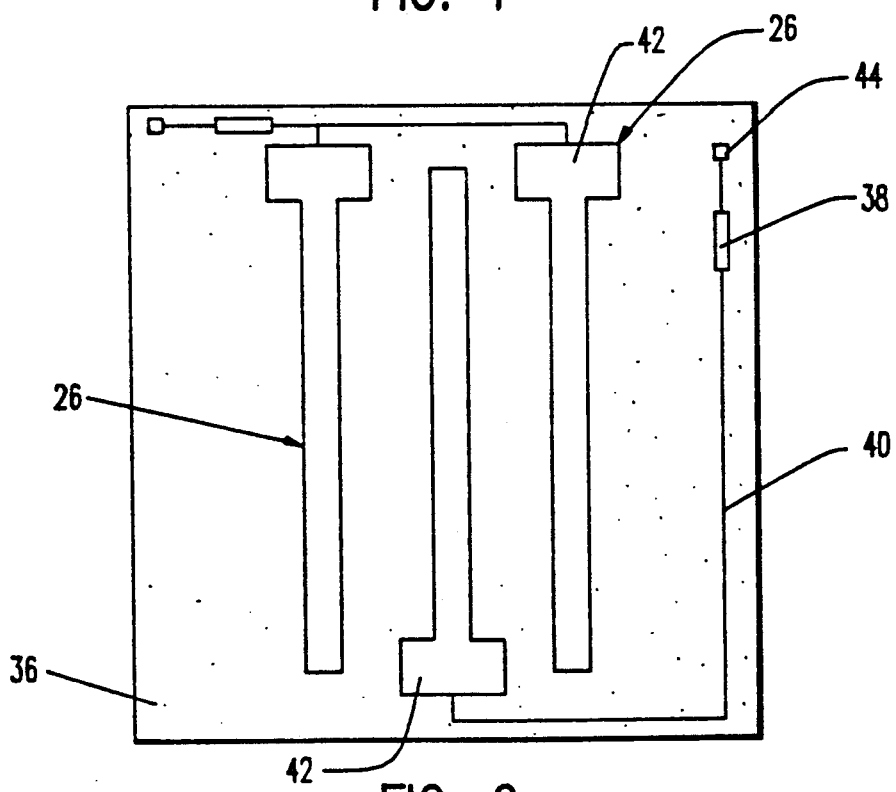
FIG. 2 is a diagrammatic plan view of the interior surface of a triode-type electrophoretic display panel backplate, which, when assembled to constitute a fluid containing envelope, would be interior to the envelope, and which is in accordance with an exemplary embodiment of the present invention.

FIG. 1 shows the rear or interior side of a faceplate 10 of an electrophoretic display panel 12 (see FIG. 3) in accordance with the present invention. The anode conductors which are shown in FIG. 2 on the backplate shown dashed in FIG. 1. The faceplate 10 is typically formed from glass and serves as a substrate upon which is deposited a plurality of independent, electrically conductive cathode members 14 (horizontal rows) using conventional deposition and etching techniques. It is preferred that the cathode members 14 be composed of Indium-Tin-Oxide (ITO) as set forth in U.S. Pat. No. 4,742,345, which is incorporated herein by reference, and which teaches an exemplary method for forming the cathode members 14. A grid 16 is superposed over the cathode members 14 and is insulated therefrom by an interstitial photoresist layer 18 (see FIG. 3). The grid 16 is an electrically equipotential element, i.e., the entire grid is in electrical continuity. The grid 16 may be formed by coating the photoresist layer 18 with a metal, such as, nickel using sputtering techniques, or the like, and then selectively masking and etching a plurality of pores 20 through the metal layer, or by depositing a plurality of grid lines in one direction then overlaying in electrically conductive association therewith another set of grid lines perpendicular thereto. Whichever method is employed, the resultant grid 16 preferably has a pore size of approximately 10 $\mu$m, a pore center-to-center spacing of about 20 $\mu$m and a grid thickness of approximately 3000 Å. The grid 16 is provided with a single conductor pathway 22 leading therefrom to a terminal 24 for receiving a voltage source. Consequently, the entire grid 16 is maintained at a single electrical potential across its entire area during operation of the display. This is in contrast to the previous grid structures which were comprised of discrete elements that could assume a variety of voltages during operation corresponding to the display operations of erase, hold and write. The present invention utilizes electrically and physically discrete anode elements 26 (see FIG. 2) to supply the horizontal coordinate (abscissa) specifying where display operations occur in place of the discrete grid elements previously used. The assembled position of the anode elements 26a with respect to the grid 16 and the cathode elements 14 is depicted in FIG. 1 in dashed lines. As in previous displays, e.g., see U.S. Pat. No. 4,742,345, each cathode member 14 terminates at one end in a contact pad 28 which is merely an enlargement of the element facilitating connection to display driver circuitry 30. Of course, if the connections 32 are, e.g., printed in the same operation as the cathode elements 14, contact pads 28 would not be necessary. The same comments apply to the anode elements 26, discussed further below. In the embodiment shown, a representative row driver circuit 30 is bonded to the faceplate 10 in accordance with the teachings of U.S. Pat. No. 4,772,820, which is incorporated herein by reference. An actual display would utilize numerous such circuits as described in U.S. Pat. No. 4,772,820. The number of cathode members 14 shown, i.e., three, is also, of course, greatly reduced for ease of illustration, as actual displays would have in the order of 2,200 such cathode members 14. An input terminal 34 is shown connected to each driver circuit 30 for purposes of illustration. More verisimilar illustrations depicting the number and arrangement of such input terminals 34 can be seen in U.S. Pat. No. 4,772,820.

FIG. 2 shows the front or interior side of a backplate 36 of an electrophoretic display panel 12 (see FIG. 3) in accordance with the present invention. The back plate 36 is preferably formed from glass and serves as a substrate upon which is deposited a plurality of independent electrically conductive anode members 26 (vertical columns). It is preferred that the anode members 26 be formed from a metal such as chrome. Besides the fact that they drive the anode members 26, rather than the cathode members 14, the anode display driver circuits 38, connections 40 from the anode element contact pads 42 to the circuits 38, and anode input terminals 44 have the same form and function as the corresponding elements connected to the cathode members 14 and described in reference to FIG. 1. It should be noted that the anode members 26, their contact pads 42, and any connections to anode driver circuits 40, as well as, the anode driver circuits 38 and anode input terminals 44 all reside on the surface of the backplate 36. This configuration does not require multiple electrical connections to be formed between elements residing in different planes. Thus, by utilizing the anode members 26 in place of discrete grid members to establish the abscissa of a display coordinate pair, the undesirable connections between two planes is eliminated. Further, since the vertical anode members 26 and their connections and driver circuitry is located on the backplate 36 instead of the faceplate 10, congestion around the periphery of the faceplate 10 is reduced by approximately one half.

Figure 3:
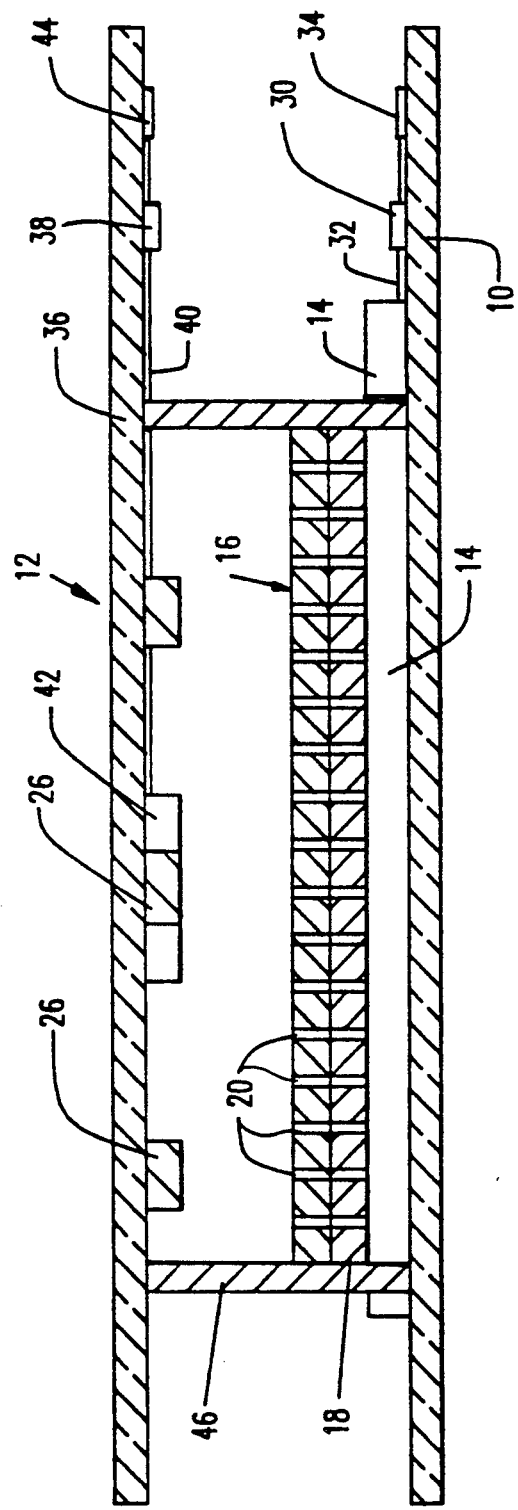
FIG. 3 is a cross-sectional view of an electrophoretic display panel assembled into a fluid containing envelope using the faceplate of FIG. 1 and the backplate of FIG. 2 assembled to an interposed sealing wall.

FIG. 3 shows the faceplate 10 and backplate 36 of FIGS. 1 and 2 sealably assembled to a peripheral sealing wall 46 to form an envelope for containing a dielectric fluid/pigment particle suspension (not shown). The faceplate 10, backplate 36 and wall 46 are sealably joined by gluing, heat sealing or any other conventional method for forming sealed glass envelopes. It should be observed that the pores 20 of the grid 16 extend through the grid 16 and also through the insulating photoresist layer 18, so that the electrophoretic fluid is in contact with the cathode members 14 via the pores 20. The extension of the pores 20 through the photoresist layer 18 can be formed through the conventional processes and techniques described in U.S. Pat. No. 4,742,345. The dimensions of the cathode members 14, insulating layer 18, grid 16, and anode members 26 are all greatly exaggerated to facilitate illustration. In actuality the cathode members preferably are approximately $-1200$ Å thick, the grid 16, approximately 500 Å thick and the anode members 26, approximately 3000 Å thick. Thus by applying voltages to the cathode members 14, grid 16 and anode members 26, suspended pigment particles in the dielectric fluid can be made to accumulate near, or disperse from, the intersections of selected cathode and anode members to translate these voltages into a visible display. These features with the exception of the respective function of the grid 16 and the anode elements 26, is in accordance with U.S. Pat. No. 4,742,345 which patent may be relied upon to supply further details of assembly and function of the display 12.

Figures 4, 5:
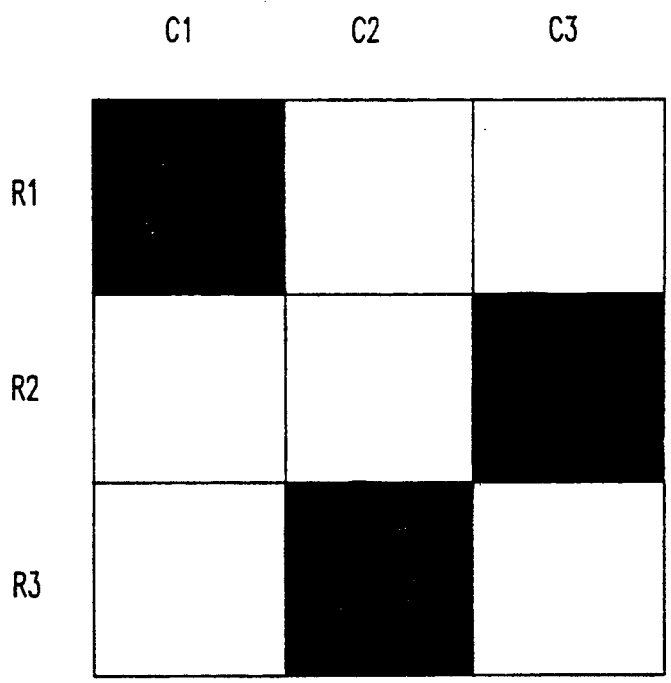
FIG. 4 is an exemplary line-by-line sequence of voltage state sets for a hypothetical 3 cathode element×3 anode element electrophoretic display constructed in accordance with the present invention as shown in FIGS. 1, 2, and 3, each line listing in the first column the observable effect on the display resulting from the set of voltage states listed in the subsequent columns of that line.
FIG. 5 is a diagrammatic depiction of a screen output image resulting from the sequential assumption of the voltage state sets of FIG. 4 assuming the same hypothetical 3×3 display as was assumed with respect to FIG. 4.

Referring now to FIG. 4, a table of voltages to be applied to a hypothetical $3 \times 3$ display is shown. Each line shows the effect upon the display of a certain combination of voltages applied the 3 cathode members (R1, R2, R3) and the 3 anode members (C1, C2, C3). It should be noted that the grid voltage is held constant in all voltage sets. The voltages, V1, V2, and V3 are a function of the amount of spacing from the anode elements 26 to the grid 16 and cathode elements 14. This spacing is chosen to minimize speading of the electrostatic field between such elements at display points, such speading resulting in a reduced resolution. Assuming a 3 mm spacing between frontplate 10 and backplate 36, appropriate voltage levels would be approximately as follows: $V1=50$ V, $V2=18$ V, and $V3=10$ V. The grid 16 would be maintained at approximately $-4$ V.

FIG. 5 illustrates the visual effect on a hypothetical $3 \times 3$ display achieved by applying the sequence of voltage sets shown in the table of FIG. 4 to a hypothetical $3 \times 3$ display constructed in accordance with the present invention, the darkened blocks representing a display bit in the written or "ON" state.

It should be understood that the embodiments described herein are merely exemplary and that a person skilled in the art may make many variations and modifications without departing from the spirit and scope of the invention as defined in the appended claims.

We claim:

1. An electrophoretic display apparatus comprising:
   (a) a fluid-tight envelope having a portion thereof which is at least partially transparent;
   (b) an electrophoretic fluid contained within said envelope, said electrophoretic fluid having pigmented particles suspended therein;
   (c) said envelope further containing therein a plurality of elongated substantially parallel horizontal conductor members disposed within a first plane and;
   (d) a plurality of elongated substantially parallel vertical conductor members electrically insulated from said horizontal conductor members and disposed within a second plane, said first and said second planes being substantially parallel, said horizontal conductor members and said vertical conductor members forming a matrix with a plurality of intersections when viewed along a line perpendicular to said first and said second planes; and
   (e) a grid substantially rigid electrically conductive continuous and equipotential at all points thereof and fixedly interposed between and electrically insulated from said horizontal and said vertical conductor members, said grid having a plurality of pores capable of admitting said electrophoretic fluid therein, said grid, said horizontal conductor members and said vertical conductor members each being selectively electrically chargeable to induce movement of said particles within said fluid, said particles being at least partially visible through said at least partially transparent portion of said envelope.

2. The device of claim 1, wherein said envelope includes a substantially flat faceplate, a central portion of which is said at least partially transparent portion of said envelope, said faceplate forming a substrate supporting said horizontal conductors members within said first plane.

3. The device of claim 2, wherein said envelope includes a backplate, said backplate forming a substrate supporting said vertical conductor members within said second plane.

4. The device of claim 3, further including a layer of insulator material overlying said horizontal conductor members, said grid being deposited upon said layer of insulator material distal to said horizontal conductor members.

5. The device of claim 4, wherein said layer of insulator material is penetrated by a plurality of bores which permit said electrophoretic fluid to contact said horizontal conductor members.

6. The device of claim 5, wherein said bores at least partially communicate with said pores of said grid such that said fluid can flow through said pores and into said bores.

7. The device of claim 6, wherein said electrophoretic display is a triode-type device, said horizontal conductor members constituting a cathode, said grid being a grid of said triode and said vertical conductor members constituting an anode of said triode.

8. The device of claim 7, further including a side wall interposed between and sealably affixed to said faceplate and said backplate to form said fluid tight envelope.

9. The device of claim 8, wherein said faceplate is glass, and said horizontal members are composed of Indium-Tin-Oxide.

10. The device of claim 9, wherein said backplate is glass and said vertical conductor members are at least partially composed of chrome.

11. The device of claim 6, wherein each of said plurality of elongated substantially parallel horizontal conductor members and each of said plurality of elongated substantially parallel vertical conductor members have an end for electrically connecting to an associated voltage source and a free end.

12. The device of claim 11, wherein said ends for electrically connecting and said free ends of succeeding said horizontal conductor members are positioned in proximity to one another on said face plate surface.

13. The device of claim 12, wherein said ends for electrically connecting and said free ends of succeeding said vertical conductor members are positioned in proximity to one another on said backplate surface.

14. The device of claim 11, further including at least one row display driver circuit affixed to said faceplate and electrically connected by electrical connections to said horizontal conductor members.

15. The device of claim 14, further including at least one column display driver circuit affixed to said backplate and electrically connected by electrical connections to said vertical conductor members.

16. The device of claim 15, wherein said horizontal conductor members, said at least one row display driver circuit and said electrical connections therebetween all reside substantially in said first plane.

17. The device of claim 16, wherein said vertical conductor members, said at least one column display driver circuit, and said electrical connections therebetween all reside substantially in said second plane.

18. The device of claim 17, further including input terminals disposed on said faceplate in said first plane for said at least one row display driver circuit.

19. The device of claim 18, further including input terminals disposed on said backplate in said second plane for said at least one column display driver circuit.

* * * * *